United States Patent [19]

Kim et al.

[11] Patent Number: 5,633,857

[45] Date of Patent: May 27, 1997

[54] APPARATUS AND METHOD FOR CONTROLLING DATA TRANSMISSIONS IN A COMMUNICATION NETWORK

[75] Inventors: Chang-ho Kim, Kyunggi-do; Eog-woo Choi, Seoul, both of Rep. of Korea

[73] Assignee: GoldStar Information & Communications, Ltd., Seoul, Rep. of Korea

[21] Appl. No.: 540,905

[22] Filed: Oct. 11, 1995

Related U.S. Application Data

[63] Continuation-in-part of Ser. No. 396,421, Feb. 28, 1995, abandoned, which is a continuation of Ser. No. 89,236, Jul. 9, 1993, abandoned.

[30] Foreign Application Priority Data

| Jul. 15, 1992 | [KR] | Rep. of Korea | 92-12576 |
| Sep. 7, 1992 | [KR] | Rep. of Korea | 92-16308 |
| Nov. 30, 1992 | [KR] | Rep. of Korea | 92-22865 |

[51] Int. Cl.$^6$ .................................................. H04L 12/40
[52] U.S. Cl. .............................. 370/242; 395/182.07
[58] Field of Search ........................ 370/85.1, 85.2, 370/85.3, 94.1, 94.2, 60, 60.1, 17, 13, 16, 56; 371/10.2; 340/827; 379/221; 395/181, 182.11, 182.22, 182.21, 183.01, 183.07, 740, 182.07, 182.08

[56] References Cited

U.S. PATENT DOCUMENTS

| 4,354,226 | 10/1982 | Flickinger | 364/200 |
| 4,608,559 | 8/1986 | Friedman et al. | 370/85.3 |
| 5,249,183 | 9/1993 | Wong et al. | 370/85.3 |
| 5,299,193 | 3/1994 | Szczepanek | 370/85.1 |

*Primary Examiner*—Benedict V. Safourek
*Assistant Examiner*—Dang Ton
*Attorney, Agent, or Firm*—Perman & Green

[57] ABSTRACT

An apparatus for controlling data transmissions in a communication network which includes a plurality of nodes connected to a common bus, each of said nodes having a communication processor with a memory and a bus control device associated with the processor. The apparatus comprises malfunction a detect control device provided in one of the nodes for detecting a malfunction in the network and generating a malfunction signal to every node over the bus when the malfunction is detected and an alarm to an operator for repair of the network in case of a network malfunction, a malfunction detect device provided in each of the other nodes for receiving the malfunction signal and controlling the connection with a bus diagnosing device provided in every node and responsive to the malfunction detect device for diagnosing whether the detected malfunction has occurred in its node and forcing the processor to stop its operation for data transmissions; and the malfunction detect device also forcing the bus control device to disconnect with the bus, thereby removing the malfunction in the network.

3 Claims, 6 Drawing Sheets

001
APPARATUS AND METHOD FOR CONTROLLING DATA TRANSMISSIONS IN A COMMUNICATION NETWORK

This is a continuation-in-part of application Ser. No. 08/396,421 filed Feb. 28, 1995 now abandoned which is a continuation of application Ser. No. 08/089,236 filed Jul. 9, 1993 now abandoned.

FIELD OF THE INVENTION

The present invention relates to a communication network including a plurality of nodes or stations connected to a common bus for data communications therebetween, each of which has a communication processor with a memory. More particularly, this invention relates to an apparatus and a communication network and an apparatus there for.

BACKGROUND OF THE INVENTION

FIG. 1 illustratively shows the structure of one prior art node in a data communication network which has a plurality of nodes or stations such as terminals or workstations with data communication functions. The network is a Round-Robin type and is operated in a token-passing mode for serial data transmission between the nodes or stations over a bus type communication path.

Each node includes a processor 10 having a communication function, a bus control unit 30, and a malfunction detect/control unit 20. The bus control unit 30 interfaces the processor 10 with the bus and outputs a bus acknowledge signal to the processor 10 responsive to a bus request signal from the processor 10 when a token is passed to the processor 10 for the permission of access to the network. Also, the malfunction detect/control unit 20 detects a malfunction occurred in the network. If a malfunction is detected, the malfunction detect/control unit 20 provides a malfunction signal to processor 10 to stop the data transmission, and at the same time sends a blocking signal to the bus control unit 30 for disconnecting with the bus.

Referring now FIG. 2, the bus control unit 30 in the node comprises a Direct Memory Access Controller(DMAC) 31, a serial Data Input/Output Device(SIO) 32, a bus driver 34 and a bus control module 33. The DMAC 31 accesses parallel data stored in the memory of the processor 10 at a high speed over a system bus in the node, which permits fast data transmissions. The SIO 32 converts parallel data from the DMAC 31 into serial data for serial data transmission over the bus. The bus driver 34(for example, IEEE 488) provides a physical connection between the processor 10 and the network. The bus control module 33 in the node provides a bus acknowledge signal to the processor 10, when a token is given to the processor 10 after receiving a bus request signal from the processor 10. The bus control module 33 transmits data from the SIO 32 via the bus driver 34 to the bus, and data sent from other node in the network over the bus to the SIO 32. The system bus is a path for connecting elements such a memory, a processor, a DMAC and a SIO in each node.

The operation of the node for data transmission over the bus is explained below. The processor 10 starts to serially transmit data after receiving the bus acknowledge signal from the bus control unit 30 which allows the bus occupation for data transmission. The malfunction detect and control unit 20 includes a counter circuit, and is synchronized to be active with the bus acknowledge signal. The malfunction detect and control unit 20 serves to control the bus control unit 30.

For example, if the bus occupation by the processor 10 in a node exceeds the maximum bus asserting time for transmitting the preestablished number of data frames, then the malfunction detect/control unit 20 considers this as some malfunction of the node itself. Thus, the malfunction detect and control unit 20 outputs a malfunction signal to the processor 10 to stop the data transmission and a blocking signal to a bus control unit 30 to disconnect with the bus. As a result, the node releases the bus so that the next node may occupy the bus for data transmission.

Further in detail, the logic used by the processor 10 in data communication is described referring to FIG. 3. When the processor 10 has data to transmit, the processor 10 outputs a bus request signal to the bus control module 33. The bus request action of the processor 10 in the step of S101 is as follows.

The counting of the bus control unit 33 with assertion-synchronizing clock is continued to reach the preestablished value(for example, FFH) until a token is passed, then the bus is not occupied. At this time, the processor 10 which has requested the occupation of bus decides at the step of S102 whether a bus acknowledge signal is received. When the response is "yes", the DMAC and SIO is enabled at the step of S103. Then, the bus control module 33 outputs a bus acknowledge signal to the processor 10 and a bus asserting signal to the network over the bus and enable the bus driver 34 to connect with the bus. At this time, the processor 10 starts to transmit data over the bus(step S104) via the bus control unit 30. At the steps of S105 and S106, when the data transmission is completed, the bus control module 33 release the bus for the data transmission of another node in the next oder. If the data transmission is not yet completed in the step of S105, the steps of S104 and S105 are repeated until the data transmission is completed.

In the prior art, the detecting of malfunction in a network including a plurality of nodes is performed in the node which occupies the bus by checking the maximum occupation time of the bus allowed to the node to ensure an equal opportunity for the bus occupation to each node.

Hence, the prior art network cannot detect a malfunction caused by failure the network itself. Also, the prior art network cannot monitor the malfunction in each node and cannot be recovered from the malfunction when the network itself is malfunctioned.

Referring now to FIG. 2 and FIG. 3, the prior art network for data transmission functions such that after sending a bus-request signal to initiate the data transmission over the bus the processor waits until a bus acknowledge signal is received, and therefore time delay occurs for the data transmission process because a bus-request signal is produced during operation of the program, while the bus-acknowledge signal is produced randomly so that the controlling of the bus would also be random. Thus, no regularity of the bus request signal with the bus acknowledge signal prevents stable control for data transmission. The additional control for confirming a bus-acknowledge signal is needed, which causes delay of the data transmission.

OBJECTS OF THE INVENTION

Accordingly, one of the objects of the present invention is to provide improved apparatus and method for controlling data transmissions in a communication network removing the drawbacks of the prior art mentioned above.

According to the invention, an apparatus for controlling data transmissions in a communication network which includes a plurality of nodes connected a common bus, each of the nodes having a communication processor with a memory and bus control means which includes a direct memory access controller(DMAC) for accessing parallel data in the memory, means for converting i.e. from parallel data to serial data or on the contrary there to a bus control module responsive to a bus request signal of the processor for generating a bus acknowledge signal and a bus driver for connection with the bus for data transmissions over the bus, the apparatus comprising:

malfunction detect/control means provided in one of the nodes which serves as a master, for detecting a malfunction in the network and generating a malfunction signal to each node over the bus when the malfunction is detected;

malfunction detect means provided in the other nodes which serve as a slave node for receiving the malfunction signal over the bus;

wherein local diagnosing means is further provided in each node for responding to the malfunction detect means which diagnose whether the malfunction is occurred in its node with a bus asserting signal generated from the bus control means when the processor occupies the bus for data transmission;

wherein in a malfunctioned node, the local diagnosing means force the processor to stop data transmission and the malfunction detect means controls the bus control means to disconnect with the bus, whereby a malfunctioned node is disconnected from the network and the network returns to a normal condition; and wherein the malfunction detect/control means decides that the malfunction does not results from the malfunctioned node when the malfunction is continuously detected without the bus asserting signal from any node and generates an alarm to an operator of the network for repair thereof.

BRIEF DESCRIPTION OF THE INVENTION

The novel features characteristic of the invention will become more apparent from the together with the accompanying drawings, wherein.

DETAILED DESCRIPTION OF THE INVENTION

Figure 4:
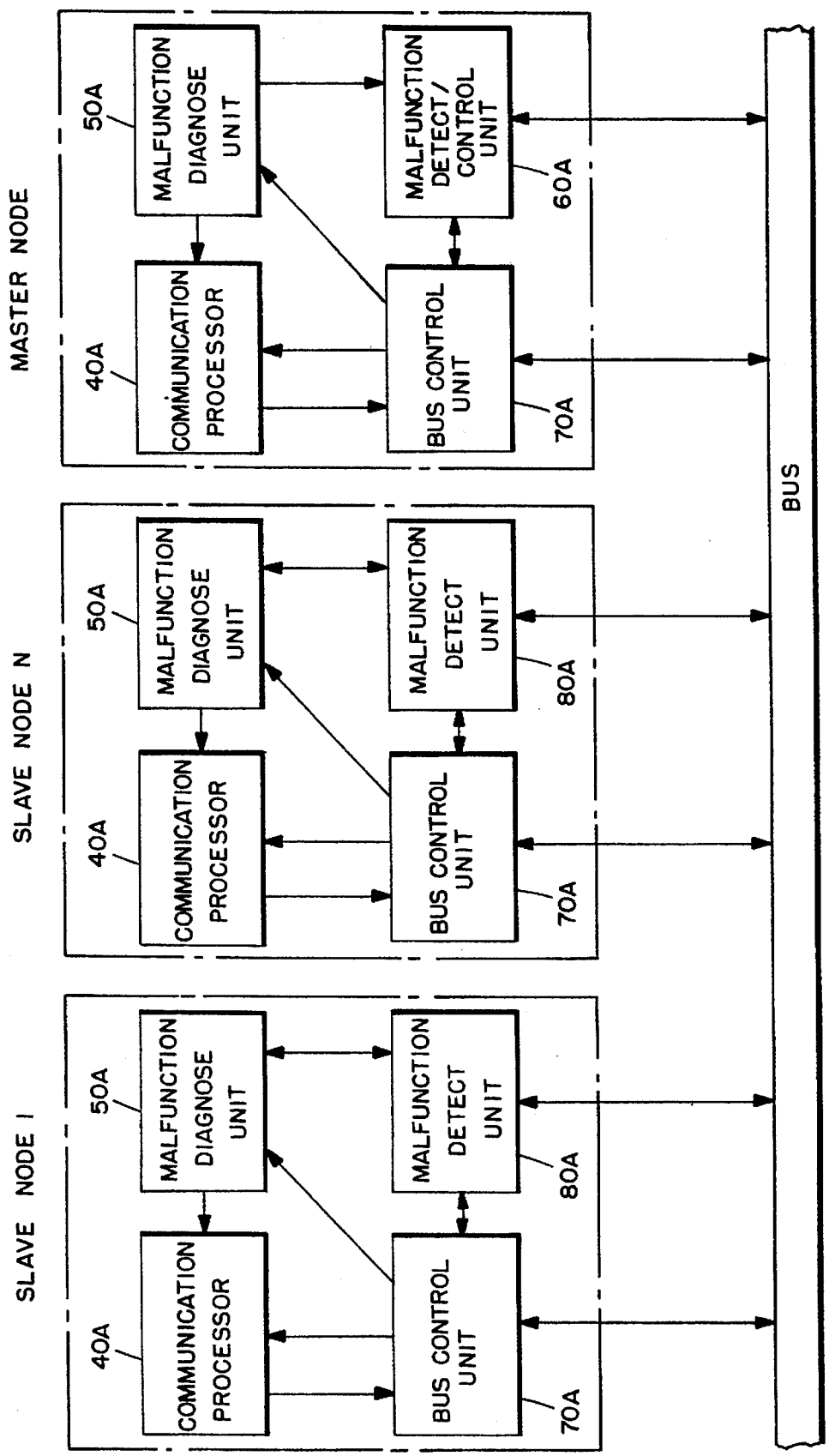
FIG. 4 is a block diagram schematically showing the structures of nodes in the communication network according to the invention.

Referring to FIG. 4, nodes according to one embodiment of the which is one of present invention are divided into two groups: a master node a plurality of nodes and the other slave nodes. The master node comprises a communication processor 40 having a memory a local malfunction diagnosing unit 50 which serves to diagnose if a malfunction is occurred in the master node itself; a malfunction detect/ control unit 60 which detects and controls malfunctions in a communication network; and a bus control unit 70 which interfaces with the network and produces a bus acknowledge signal to the processor 40.

Each slave node comprises a communication processor 40A with a memory; a malfunction detect unit 80; a local diagnosing unit 50A for diagnosing a malfunction occurrence in the slave node itself; a bus control unit 70A which interfaces with the network, and produces a bus acknowledge signal to a processor 40A for permission of data transmission.

When the malfunction detect/control unit 60 detects a malfunction in the network, the malfunction detect/control unit 60 produces a malfunction signal for requesting the diagnosing of malfunction to the local diagnosing units 50 and 50A of the master and slave nodes in the network.

Figure 5:
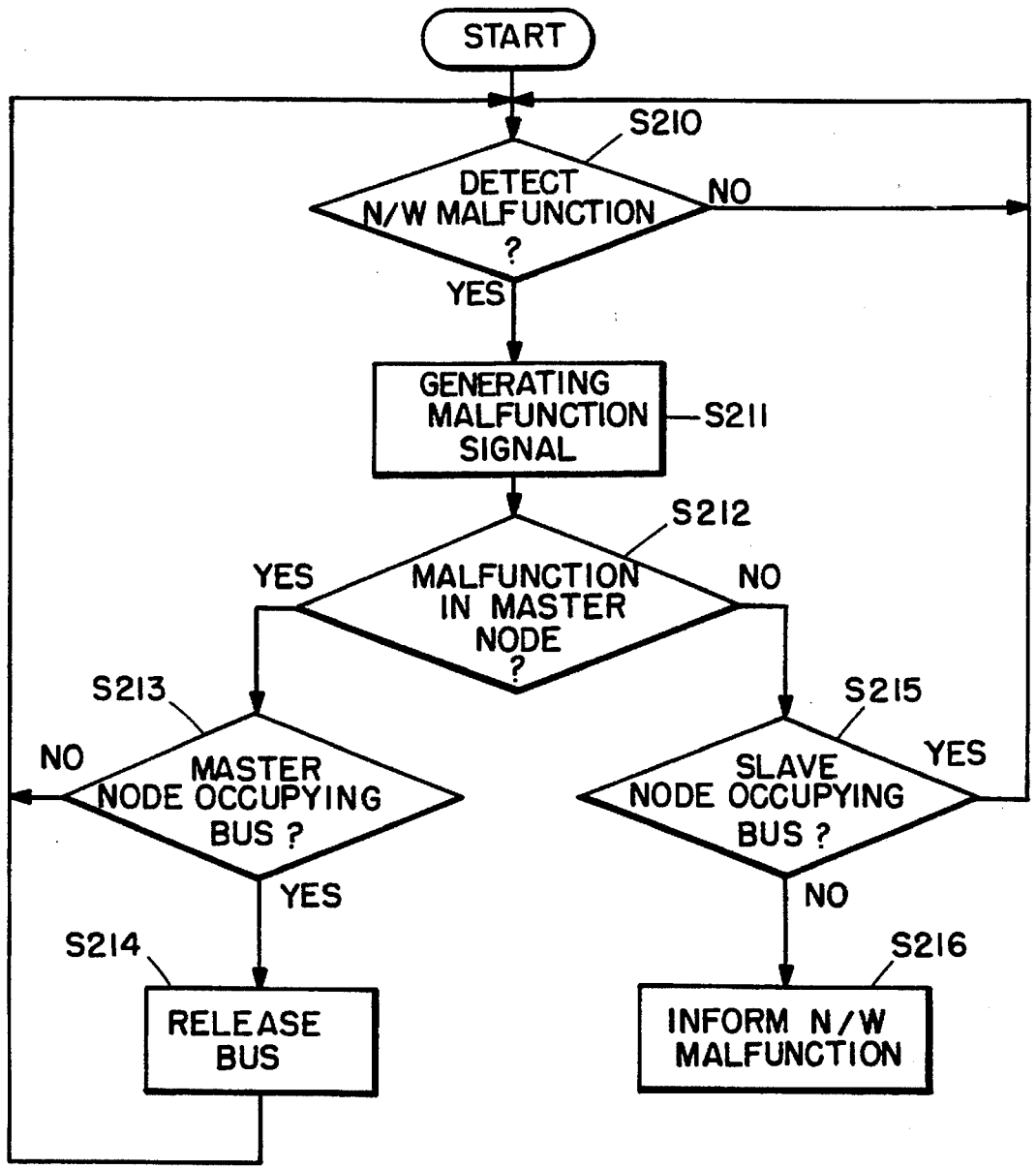
FIGS. 5 and 6 are flow charts illustrating the operations in the nodes for malfunction detection and control in a communication network shown in FIG. 4.
Figure 6:
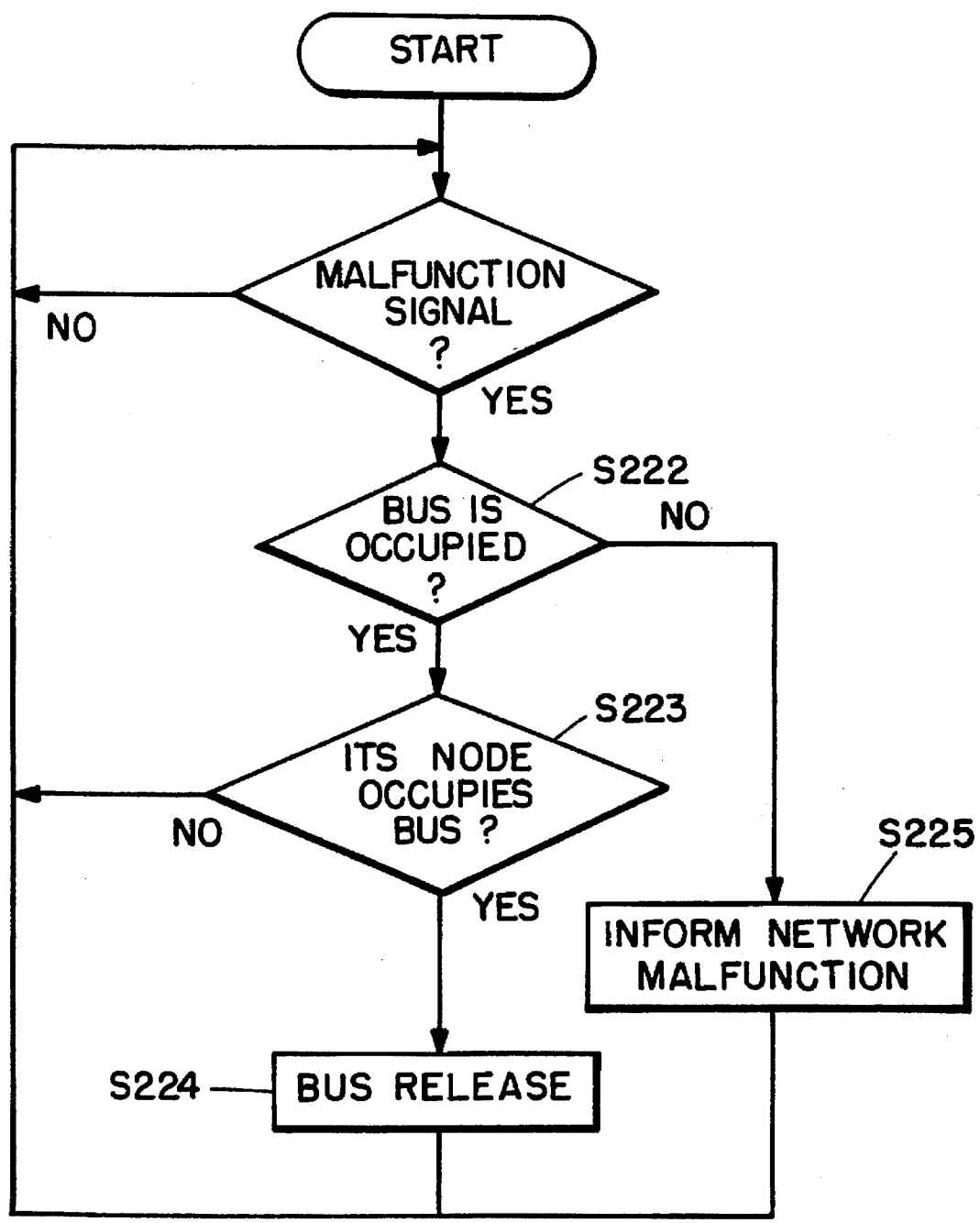

With reference now to FIG. 5 and FIG. 6, the malfunction detect and control operations in the network of according to the invention would be explained in detail. Malfunctions in the network are divided roughly into two types. One type is the malfunctions occurred in a node which is occupying the network for data transmission. The other type is the malfunctions occurred in the network itself, for example malfunctions in a channel or the operation thereof.

FIG. 5 is a flow chart showing the steps that the master node detecting and controlling a malfunction in the network. When the malfunction detect/control unit 60 of the master node detects a malfunction from the bus(S210), the malfunction detect/control unit 60 produces a malfunction signal to each node over the bus and its own local diagnosing unit 50 (S212). When the local diagnosing unit 50 receives a bus-asserting signal from the bus control unit 70(S213), the local diagnosing unit 50 decides that the malfunction is caused by the errors or fails in the master node. Then, the local diagnosing unit informs the malfunction occurrence to the malfunction detect/control unit 60 which forces the bus control unit 70 to disconnect with the bus(S214), and forces the processor 4o to stop its operations for data transmission, whereby the malfunction is removed and the network returns to a normal condition.

Also, when the malfunction detect unit 80 in each of the slave nodes detects the malfunction signal from the malfunction detect/control unit 60 over the bus, the diagnosing and controlling processes in each slave node is performed by the malfunction diagnosing unit 50A and malfunction detect unit 80 as in the master node.

If the malfunction detect/control unit 60 does not detect the bus asserting signal from any node over the bus; nevertheless a malfunction is detected, the malfunction detect/ control unit 60 decides that the malfunction is coused by fails or errors in the network itself(S215) and generates an alarm to an operator of the network for the repair hereof (S216).

Referring to FIG. 6, when the malfunction detect unit 80 in a slave node detects a malfunction signal from the master node over the bus(S221), as in the master node, the malfunction diagnosing unit 50A watches the bus asserting signal from the bus control unit 70A and the operation of its processor 40A(S222 and S223) If the bus asserting signal and the operation of the processor 40A are detected, the diagnosing unit 50A forces the bus control unit 70A disconnect with the bus by the malfunction detect unit 80(S224).

Figure 7:
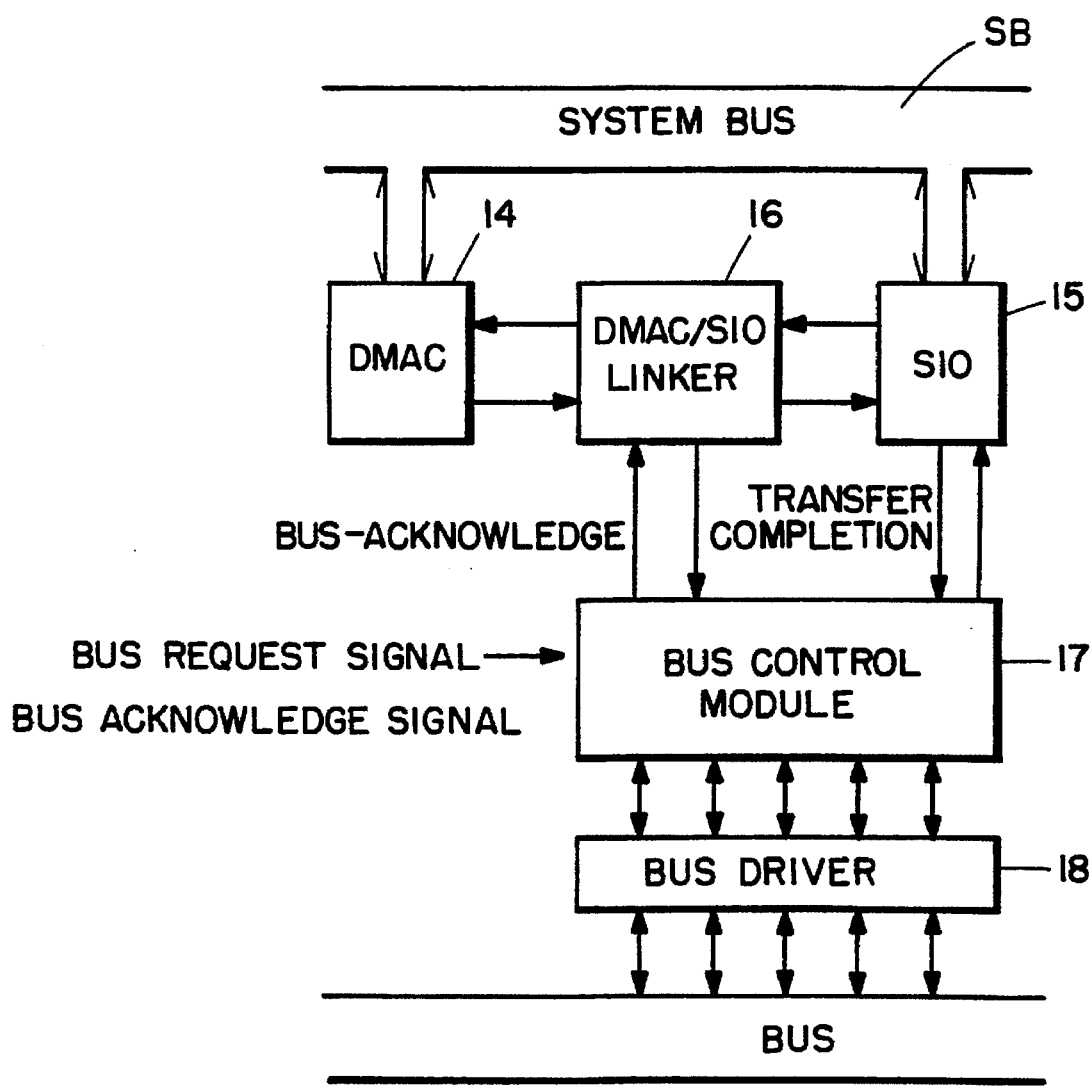
FIG. 7 is an detailed block diagram of the bus control unit in a node according to the invention.

FIG. 7 schematically shows the structure of the bus control unit 70 or 70A including a direct memory access controller(DMAC) 14, a serial Input/Output unit(SIO) 15, a bus control module 17, and a bus driver 18 and a DMAC/

Figure 1:
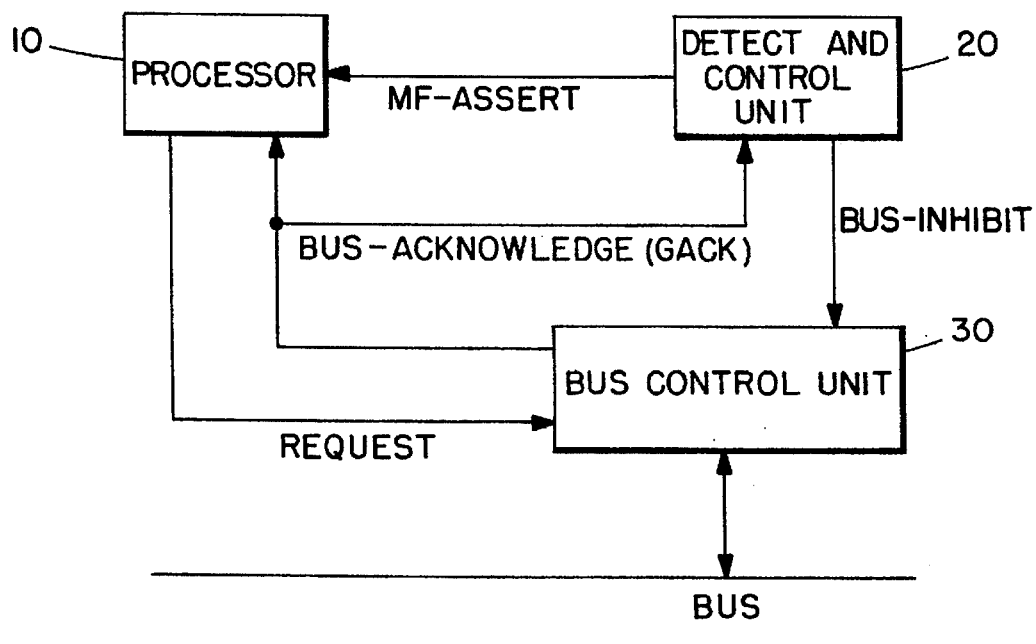
FIG. 1 is a schematic block diagram showing the structures of nodes which is connected to a prior art communication network.
Figure 2:
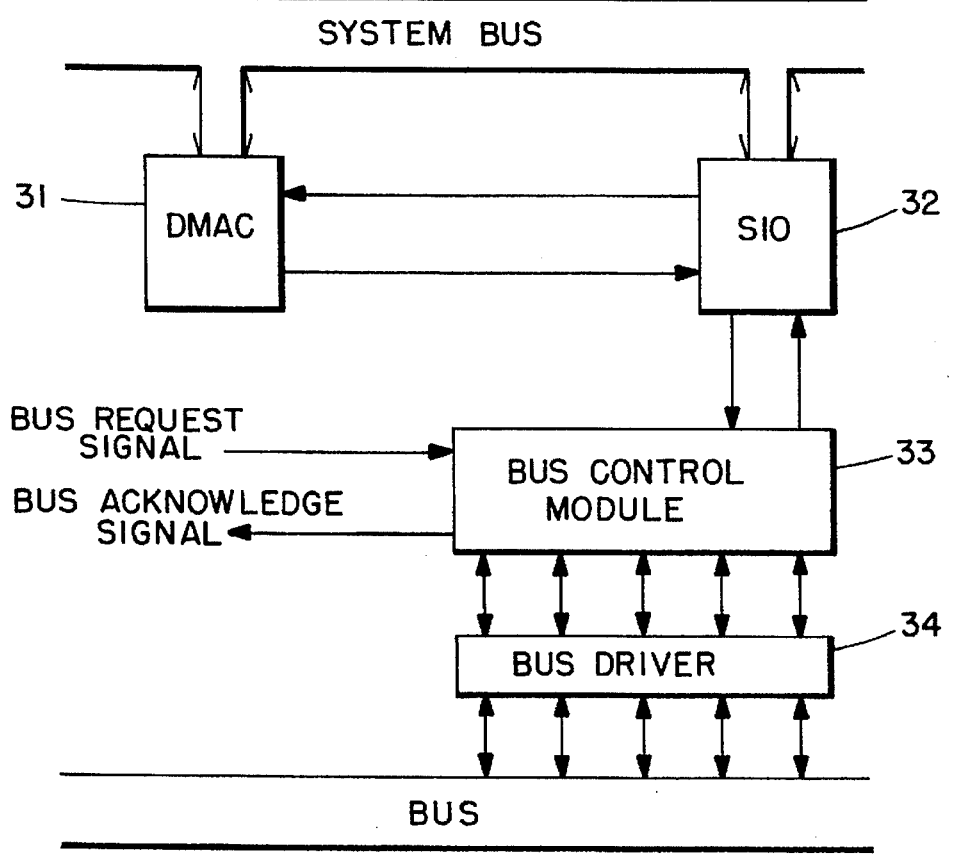
FIG. 2 is a block diagram of a bus control unit shown in FIG. 1.
Figure 3:
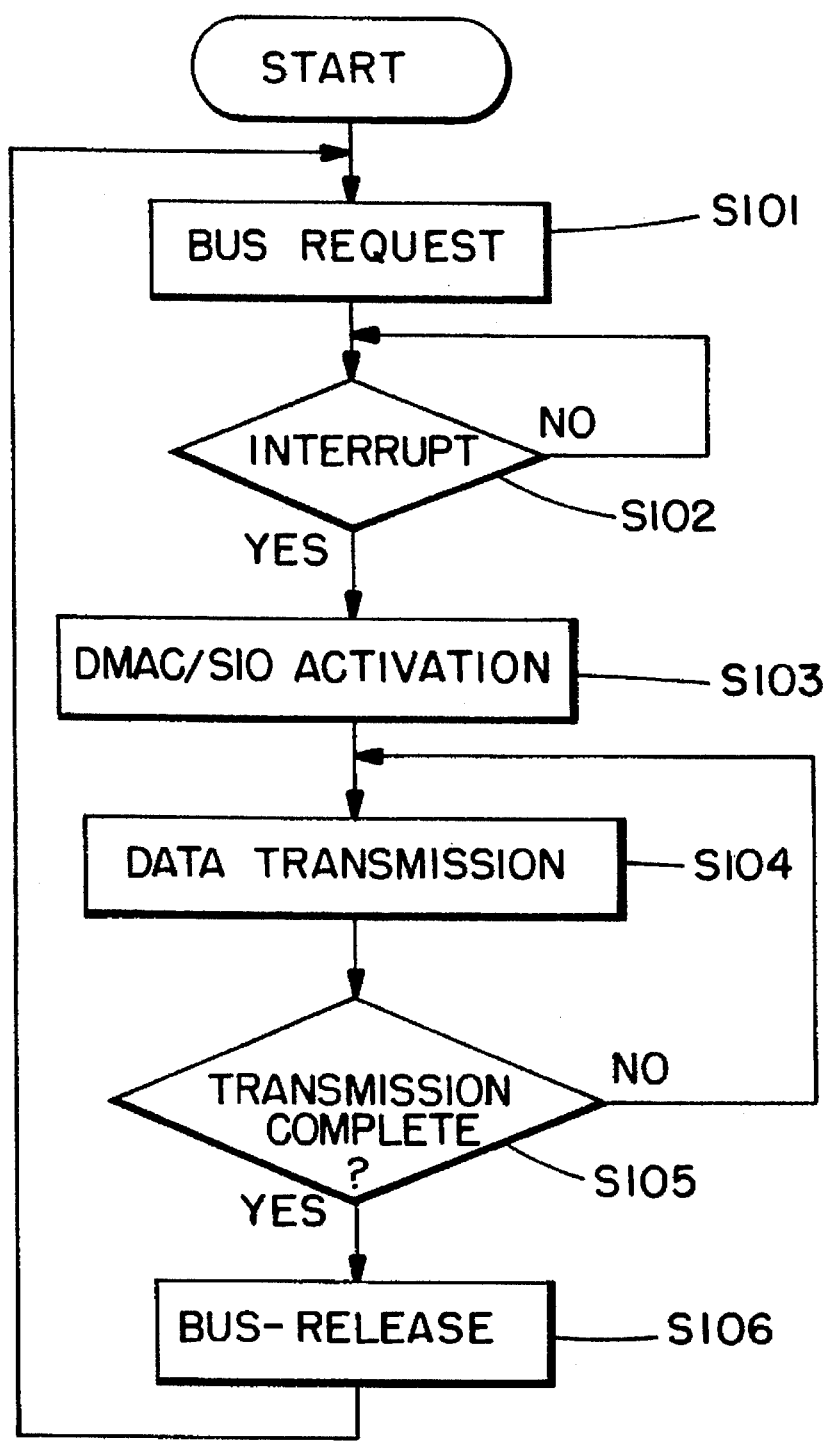
FIG. 3 is a flow chart of the control process for data transmission in a prior art node.

SIO linker 16. The structure of the bus control unit 70 or 70A is identical as the prior art descriptions with FIG. 2 except the DMAC/SIO linker 16.

The DMAC 14 and the SIO 15 are connected to the processor 40 or 40A with a memory by a system bus in each node.

According to the invention, the DMAC/SIO linker 16 is associated with the DMAC 14 and the SIO 15. The linker 16 controls data transmissions between the DMAC 14 and the SIO 15. That is, the linker 16 permits the data transmissions from the DMAC 14 to the SIO 15 when a bus acknowledge signal from the bus control module 17 is received to the linker 16, and then produces a transmission finishing signal to force the bus control module to disconnect to the bus when the transmission is completed whereby the time delay for data transmission from the processor to the bus is removed. However, the data received from bus via the SIO 15 is passed to the DMAC without any control.

What is claimed is:

1. An apparatus for controlling data transmissions in a communication network which includes a plurality of nodes connected to a common bus, each of said nodes having a communication processor with a memory and bus control means associated with the processor for transmitting data from the processor to the network over the bus, said bus control means including a direct memory access controller (DMAC) for accessing parallel data in the memory, means for converting from parallel data to serial data or vice versa, a bus control module for generating a bus acknowledge signal and responding to a bus request signal from the processor and a bus asserting signal from said bus control means during data transmission, and a bus driver for connection with the bus for data transmissions, the apparatus comprising:

malfunction detect/control means provided in one of said nodes for detecting a malfunction in the network and generating a malfunction signal to said nodes including itself over the bus when the malfunction is detected;

malfunction detect means provided in each of the other nodes for receiving said malfunction signal from the malfunction detect/control means over the bus;

diagnosing means provided in every node, responding to the malfunction detect means for diagnosing whether the detected malfunction is occurred in its node; and wherein in the malfunctioned node, said diagnosing means forces the processor to stop its operation for data transmissions and the malfunction detect means or the malfunction detect/control means also forces the bus control means to disconnect with the bus, thereby removing the malfunction in the network;

wherein, when said malfunction detect/control means continuously detects a malfunction in the network without receiving of a bus asserting signal, said malfunction detect/control means decides that the malfunction is occurred in the network itself and then produces an alarm to an operator of the network for repair thereof.

2. The apparatus claimed in claim 1, wherein a linker is provided between the DMAC and serial/parallel data converting means for permitting data transmission from the DMAC to the serial/parallel data converting means when the bus acknowledge signal is received from the bus control module and for producing a data transmission finishing signal to the bus control module to disconnect with the bus when the data transmission is finished.

3. A method for controlling data transmission in a communication network which includes a plurality of nodes connected to a common bus, each of said nodes having a communication processor with a memory, bus control means for providing a bus acknowledge signal to the communication processor and malfunction diagnosing means for diagnosing a malfunction, one of said nodes further having malfunction detect/control means for detecting a malfunction and generating a malfunction signal and each of the other nodes further having malfunction detect means for detecting malfunctions, the method comprising the steps of:

detecting in the malfunction/control means a malfunction in the network and producing a malfunction signal to every node over the bus;

detecting the malfunction signal in the malfunction detect means in every node;

determining whether the malfunction is occurred, in the malfunction diagnosing means in each node responding to the bus control means;

stopping the operation of the processor for data transmission responding to the malfunction diagnosing means and disconnecting the bus control means from the bus by the malfunction detect means in the node where the malfunction is occurred;

indicating the network malfunction to an operator of the network by the malfunction detect/control means when the malfunction is continuously detected without a bus asserting signal from any node.

\* \* \* \* \*